United States Patent
Tsuboi et al.

(10) Patent No.: US 10,214,122 B2
(45) Date of Patent: Feb. 26, 2019

(54) VEHICLE SEAT

(71) Applicants: TS TECH CO., LTD., Asaka-shi, Saitama (JP); HONDA MOTOR CO., LTD., Tokyo (JP)

(72) Inventors: Yoshimichi Tsuboi, Tochigi (JP); Yuta Yaguchi, Tochigi (JP); Tatsuya Sasaki, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 58 days.

(21) Appl. No.: 15/127,071

(22) PCT Filed: Mar. 20, 2015

(86) PCT No.: PCT/JP2015/058520
§ 371 (c)(1),
(2) Date: Sep. 19, 2016

(87) PCT Pub. No.: WO2015/141837
PCT Pub. Date: Sep. 24, 2015

(65) Prior Publication Data
US 2017/0106774 A1    Apr. 20, 2017

(30) Foreign Application Priority Data
Mar. 20, 2014    (JP) .................................. 2014-058898

(51) Int. Cl.
*B60N 2/40*    (2006.01)
*B62J 1/14*    (2006.01)
(Continued)

(52) U.S. Cl.
CPC    *B60N 2/40* (2013.01); *B62J 1/12* (2013.01); *B62J 1/14* (2013.01); *B62J 1/18* (2013.01); *B62J 1/20* (2013.01); *B62J 1/28* (2013.01)

(58) Field of Classification Search
CPC .......... B62J 1/12; B62J 1/18; B62J 1/14; B62J 1/20; B62J 1/28; B60N 2/40
See application file for complete search history.

(56) References Cited

U.S. PATENT DOCUMENTS 6,971,714 B1 * 12/2005 Hanagan .................... B62J 1/12
                                                        297/215.11
7,681,950 B2 * 3/2010 Clarkson .................... B62J 1/12
                                                        180/219
(Continued)

FOREIGN PATENT DOCUMENTS

EP    2 431 264 A1    3/2012
JP    H01-202587 A    8/1989
(Continued)

OTHER PUBLICATIONS

Extended European Search Report issued in related application EP 15765630.7, dated Dec. 13, 2017, 8 pages.

*Primary Examiner* — David R Dunn
*Assistant Examiner* — Tania Abraham
(74) *Attorney, Agent, or Firm* — Drinker Biddle & Reath LLP

(57) ABSTRACT

A vehicle seat suitable as a straddle-type seat for a two or three-wheeled vehicle is provided, the straddle-type seat being configured to be shifted between a tip-up state and a seated state by a rotation mechanism, wherein there is no interference between the rotation mechanism and the seat. The vehicle seat of the present disclosure has a bottom plate, a seating portion, and a side portion. The seating portion and the side portion are covered by a surface material. In this vehicle seat configured to be shifted between the seated state and the tip-up state by the rotation mechanism, a recessed portion for the rotation mechanism is provided at the side portion facing the rotation mechanism.

7 Claims, 10 Drawing Sheets

(51) Int. Cl.
  *B62J 1/18* (2006.01)
  *B62J 1/20* (2006.01)
  *B62J 1/28* (2006.01)
  *B62J 1/12* (2006.01)

(56) References Cited

U.S. PATENT DOCUMENTS

2004/0222679 A1  11/2004  Michisaka et al.
2005/0206204 A1   9/2005  Ogawa et al.
2014/0327280 A1  11/2014  Honma et al.

FOREIGN PATENT DOCUMENTS

| JP | 2004-331042 A | 11/2004 |
| JP | 2005-262993 A | 9/2005 |
| JP | 2007-153265 A | 6/2007 |
| JP | 2009-173269 A | 8/2009 |
| JP | 2013-112114 A | 6/2013 |
| JP | 2013-184608 A | 9/2013 |
| WO | 2013/153193 A1 | 10/2013 |

* cited by examiner

VEHICLE SEAT

CROSS-REFERENCE TO RELATED APPLICATIONS

This application is a National Stage Entry application of PCT Application No. PCT/JP2015/058520, filed Mar. 20, 2015, which claims the priority benefit of Japanese Patent Application No. JP2014-058898, filed Mar. 20, 2014, the contents being incorporated herein by reference.

BACKGROUND

This disclosure relates to a vehicle seat, and particularly to a vehicle seat being suitable as a straddle-type seat for a two or three-wheeled vehicle, which has a rear portion movable to shift between a tip-up state and a seated state.

There has been conventionally known a technique in which a vehicle seat can be shifted between a seated state and a tip-up state by a rotation mechanism such as a hinge mechanism, for example, as disclosed in Japanese Patent Publication No. JP 2005-262993.

The rotation mechanism of the vehicle seat may interfere with the seat, for example, a side portion or the like which is an outer periphery of the seat, depending on the shape or size of the rotation mechanism. In addition, "a side portion" in this Description corresponds to an outer periphery of a seat from which a seating portion is excluded, and the side portion is used as an expression including lateral portions at the front and rear sides and lateral portions at the right and left sides.

A seat for a two or three-wheeled vehicle in which a rotation mechanism may not interfere with a side portion or the like even when the rotation mechanism, for example, its shape or size is changed has been desired.

SUMMARY

Some embodiments of the present disclosure provide a vehicle seat which can be shifted between a tip-up state and a seated state by a rotation mechanism and which is suitable as a straddle-type seat for a two or three-wheeled vehicle in which interference between the rotation mechanism and the seat may not occur.

The aforementioned problem is solved by an embodiment of a vehicle seat of the present disclosure, the vehicle seat including a bottom plate, a seating portion, and a side portion, wherein the vehicle seat is configured to be shifted between a seated state and a tip-up state by a rotation mechanism, wherein the seating portion and the side portion are covered by a surface material, and wherein a recessed portion for the rotation mechanism is formed at the side portion facing the rotation mechanism. As just described, the recessed portion is formed; therefore, interference between the side portion and the rotation mechanism is inhibited by this recessed portion and the seat can be prevented from having an increased size.

In an embodiment, it is preferable that the recessed portion is a cut portion formed by cutting out the bottom plate. As just described, the recessed portion is formed by the cut portion that is formed only by cutting out the bottom plate; therefore, the recessed portion can be easily manufactured.

Further, in an embodiment, the recessed portion is a cut portion cut out into a circular arc shape. As just described, the cut portion is formed into the circular arc shape; therefore, a reduction of rigidity of the side portion, i.e., an outer periphery of the seat can be reduced.

Furthermore, in an embodiment, the outside of the recessed portion is covered by a cover member. As just described, the recessed portion is covered by the cover member; thereby, the entrance of foreign substances via the recessed portion can be reduced.

In addition, in an embodiment, the surface material is attached along the cut portion. As just described, the cut portion has the circular arc shape. Accordingly, a surface material attachment operation at the time of attachment of the surface material along the cut portion can be easily performed with few wrinkles as compared with a case where the cut portion has a rectangular shape.

Moreover, in an embodiment, an extended portion is provided at the cover member and that the extended portion is attached to an inner surface of the side portion. As just described, the extended portion is attached to the inner surface of the side portion; thereby, the cover member can be stably attached.

According to an embodiment of the present disclosure, interference between the side portion and the rotation mechanism is inhibited by the recessed portion, and in addition, the seat can be prevented from having an increased size. Further, the recessed portion is formed by the cut portion that is formed only by cutting out the bottom plate; therefore, the recessed portion can be easily manufactured. Furthermore, the cut portion has the circular arc shape; thereby, a reduction of rigidity of the side portion, i.e., an outer periphery of the seat can be reduced. The recessed portion is covered by the cover member; thereby, the entrance of foreign substances via the recessed portion can be reduced. The cut portion has the circular arc shape. Accordingly, a surface material attachment operation at the time of attachment of the surface material along the cut portion can be easily performed with few wrinkles compared with a case where the cut portion has a rectangular shape. In addition, the extended portion is attached to the inner surface of the side portion; thereby, the cover member can be stably attached.

BRIEF DESCRIPTION OF DRAWINGS

Various embodiments of the invention are illustrated in the drawings, in which.

DETAILED DESCRIPTION

Figure 1:
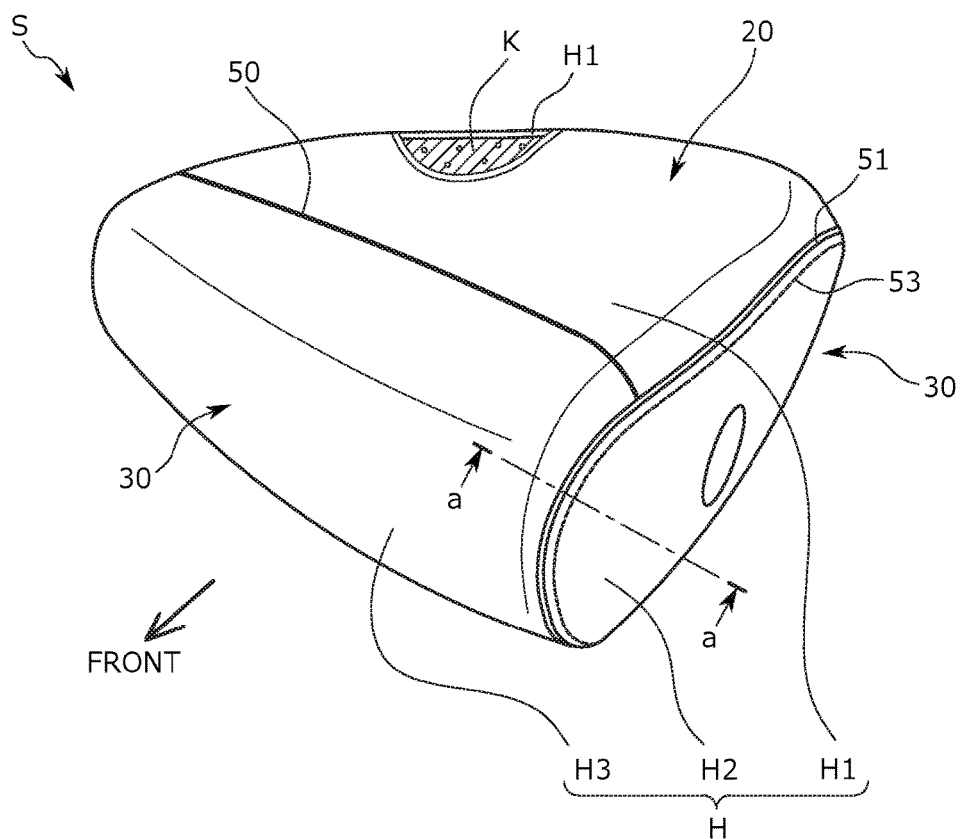
FIG. 1 is a perspective view of a two or three-wheeled vehicle straddle-type seat.
Figure 2:
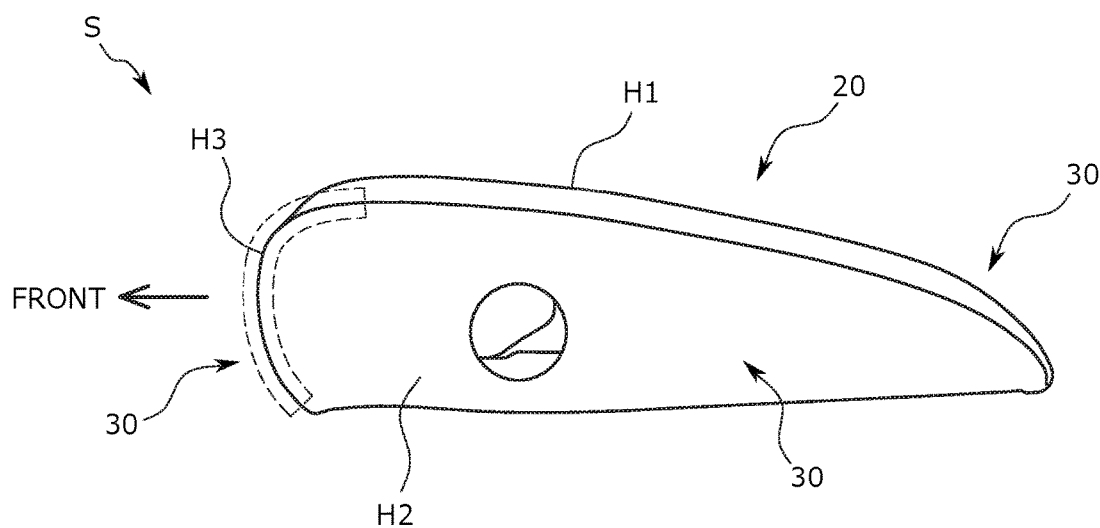
FIG. 2 illustrates a side portion at the lateral side of the two or three-wheeled vehicle straddle-type seat.

Herein, various embodiments of the present disclosure are described on the basis of the drawings. In addition, members, arrangements, or the like described below do not restrict the present disclosure and various modifications or changes may be made within the scope of the present disclosure.

A two or three-wheeled vehicle straddle-type seat is explained as an example of a vehicle seat in the present embodiment. A two or three-wheeled vehicle straddle-type seat S of the present embodiment includes a bottom plate 10, a seating portion 20, and a side portion 30. In addition, as described above, "the side portion 30" in this Description corresponds to an outer periphery of the seat from which the seating portion 20 is excluded, and the side portion is used as an expression including lateral portions at the front and rear sides and lateral portions at the right and left sides. Moreover, as shown in the drawings, a seat for a front seat and a belt are respectively indicated by symbol Sf and symbol B in the present embodiment.

Further, the two or three-wheeled vehicle straddle-type seat S is configured so that a cushion K mounted on the bottom plate 10 is covered by a surface material H. More specifically, the cushion K is covered by the surface material H so that the side portions 30 of the bottom plate 10 are wrapped inside the surface material H in a state where end portions of the surface material H are tacked and attached with staples 40 by using an attachment device such as a stapler to be positioned on the outer periphery of the bottom side of the bottom plate 10 (a surface thereof facing a vehicle body). Thus, the upper surface side corresponds to the seating portion 20 and the lateral portions of this seating portion 20 are formed as the side portions 30.

The surface material H includes a large portion H1, side gusset portions H2, and a hiding cover H3 for preventing the inside from being seen from the outside. The large portion H1 is configured by forming wooly nylon which is preliminarily formed into a predetermined shape to conform to the seat shape of the two or three-wheeled vehicle straddle-type seat S. The side gusset portion H2 is configured by non-forming wooly nylon which is not formed. The hiding cover H3 is configured by non-forming wooly nylon which is not formed. In the present embodiment as just described, the large portion H1, the side gusset portion H2, and the hiding cover H3 are formed by the same material; therefore, the surface material H can secure uniformity. In addition, the hiding cover H3 covers the outside of a cut portion which is a recessed portion 70 described below; thereby, the outer appearance is improved. In the present embodiment, the same thickness is applied to the large portion H1 and the side gusset portion H2 of the surface material H while a thickness smaller than the thickness of the large portion H1 and the side gusset portion H2 is applied to the hiding cover H3.

As shown in FIG. 1, the hiding cover H3 in the present embodiment is positioned at the front of the seating portion 20 to be sewn via a sewing line 50 to the large portion H1 that covers the seating portion 20, thereby covering the side portion 30 as the lateral portion at the front side. In addition, this sewing line 50 has the belt B described above, thereby being configured to be covered by the belt B and hidden from the outside. Along with the fact that the large portion H1, the side gusset portion H2, and the hiding cover H3 are formed by the same material, the surface material H secures the uniformity.

Figure 11A:
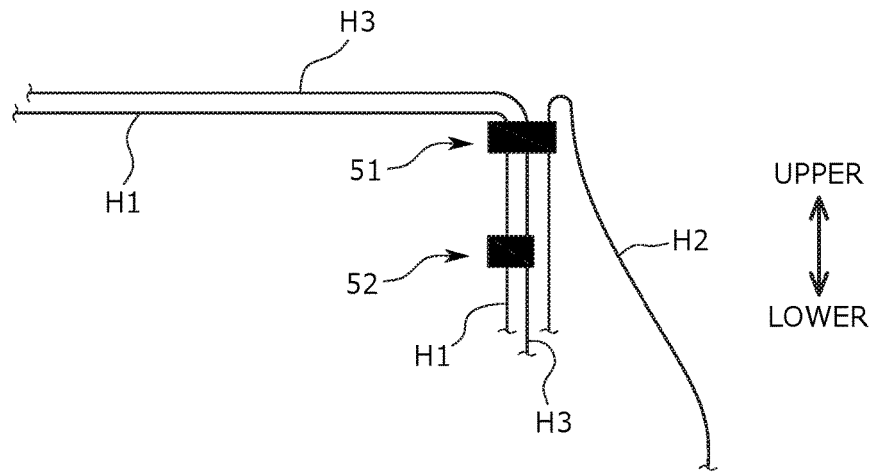
FIGS. 11A, 11B, and 11C are explanatory drawings of various sewn states of a surface material.
Figure 11B:
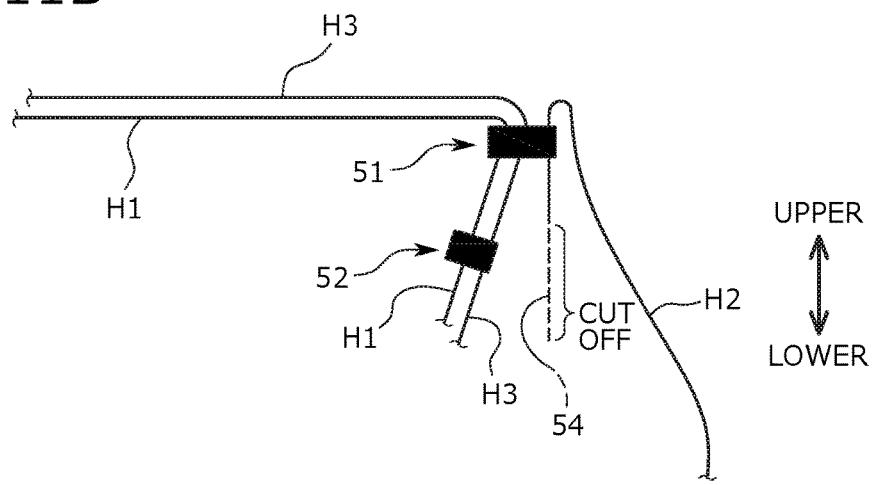
Figure 11C:
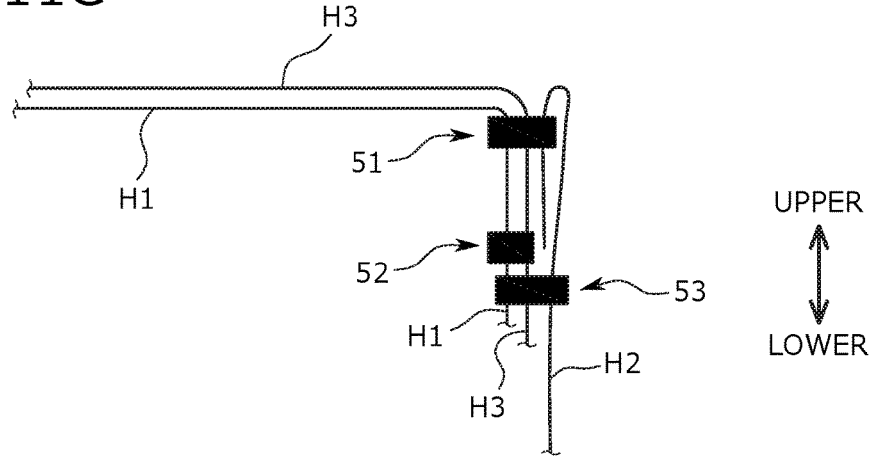

As shown in FIGS. 11A, 11B, and 11C, sewing of this surface material H to the seating portion 20 and the side portions 30 is performed by sewing the large portion H1, the side gusset portion H2, and the hiding cover H3 to one another. In other words, as shown in FIGS. 11A, 11B, and 11C, illustrating how to sew a portion which corresponds to a cross-section taken along the line a-a in FIG. 1, first, three sheets of the large portion H1, the side gusset portion H2, and the hiding cover H3 are sewn together via a first sewing portion 51. Next, the large portion H1 and the hiding cover H3 are temporarily sewn to each other via a second sewing portion 52. Then, a portion (cutting portion 54) of the side gusset portion H2, which is located adjacent to the hiding cover H3 and below the first sewing portion 51, is cut off. Thereafter, the three sheets of the large portion H1, the side gusset portion H2, and the hiding cover H3 are simultaneously sewn together by single stitching.

If a portion of the side gusset portion H2, i.e., the cutting portion 54 is cut off as described above four sheets of the surface material may be typically sewn together via a third sewing portion 53 by single stitching. As a result, unevenness may tend to be generated on the outer appearance. However, as in the present embodiment, after the large portion H1, the side gusset portion H2, and the hiding cover H3 are sewn together via the first sewing portion 51, a single seam allowance (the cutting portion 54) of the side gusset portion H2 is cut off. As a result, the unevenness may not be generated on the outer appearance when the large portion H1, the side gusset portion H2, and the hiding cover H3 are sewn together via the third sewing portion 53; therefore, the outer appearance may have no influence.

Figure 10:
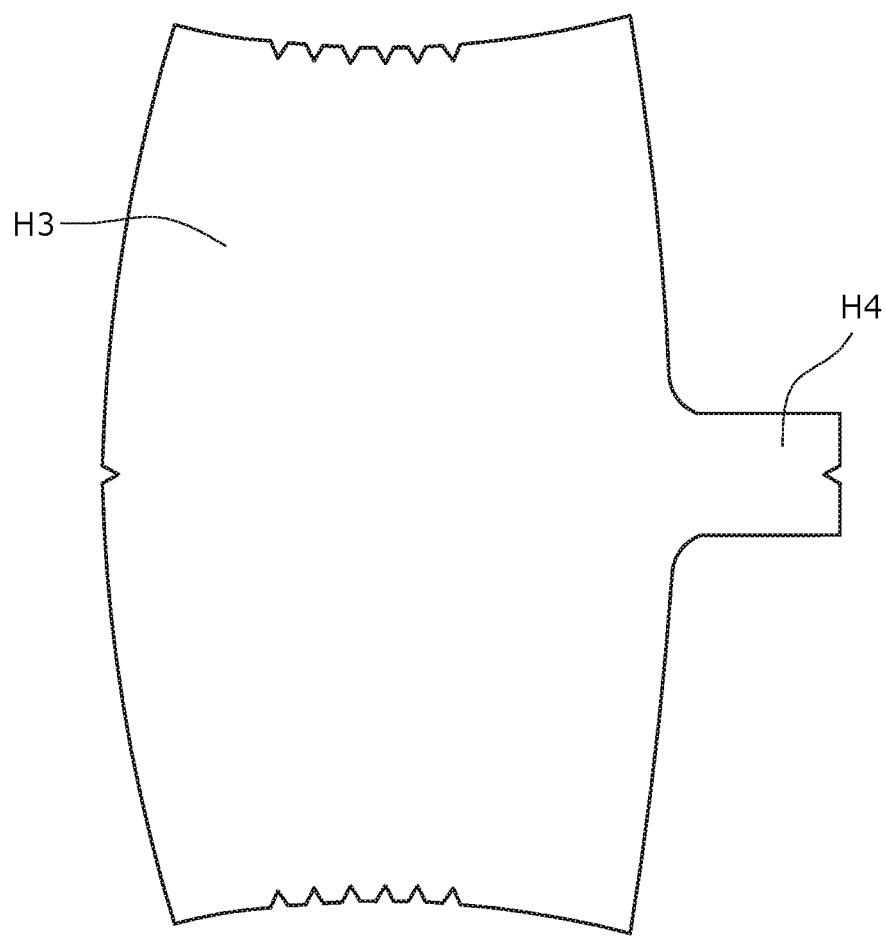
FIG. 10 is an explanatory drawing of a fixing surface cover.

FIG. 10 is an explanatory drawing of a fixing surface cover H4. This fixing surface cover H4 serves to prevent the hiding material H3 from being unevenly stretched. The fixing surface cover H4 is formed as an extended portion integrally formed with the hiding cover H3 to be extended from a center position (center) at an end side of the hiding cover H3 serving as a cover member. In addition, the fixing surface cover H4 is fixed to the bottom plate 10 by the staples 40.

Figure 3:
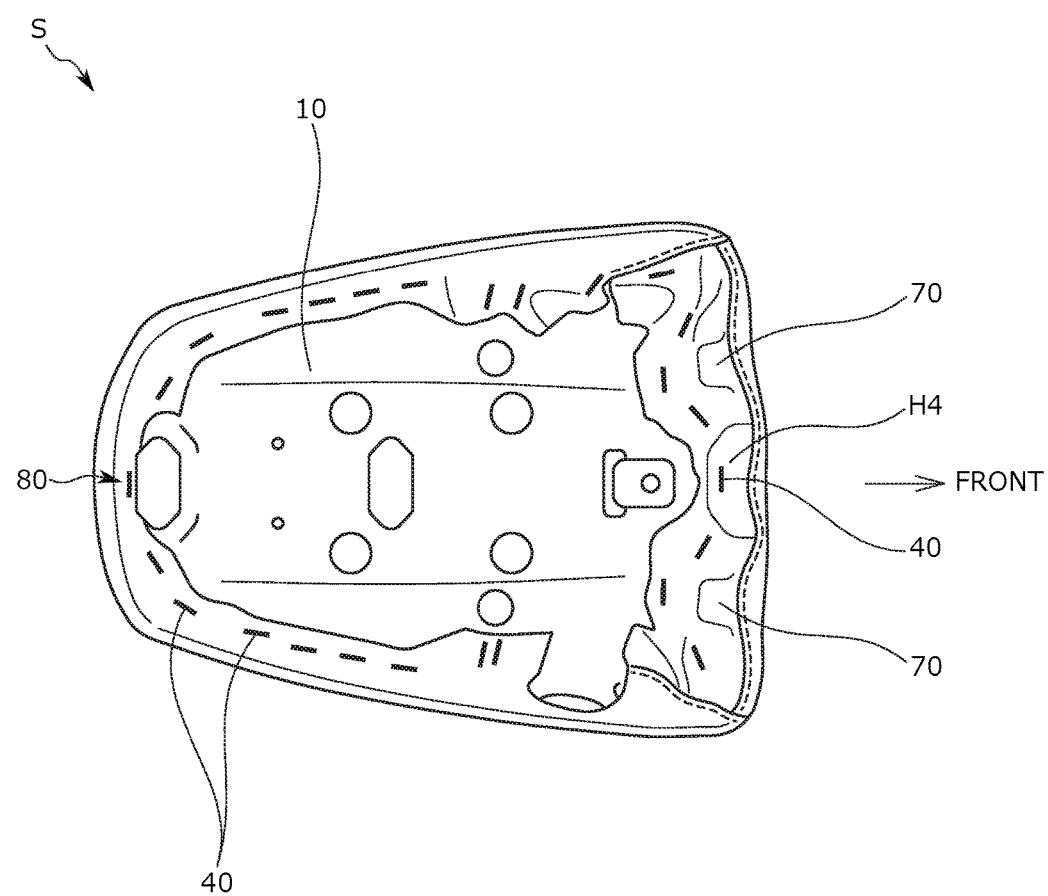
FIG. 3 is a bottom view of the two or three-wheeled vehicle straddle-type seat.
Figure 4:
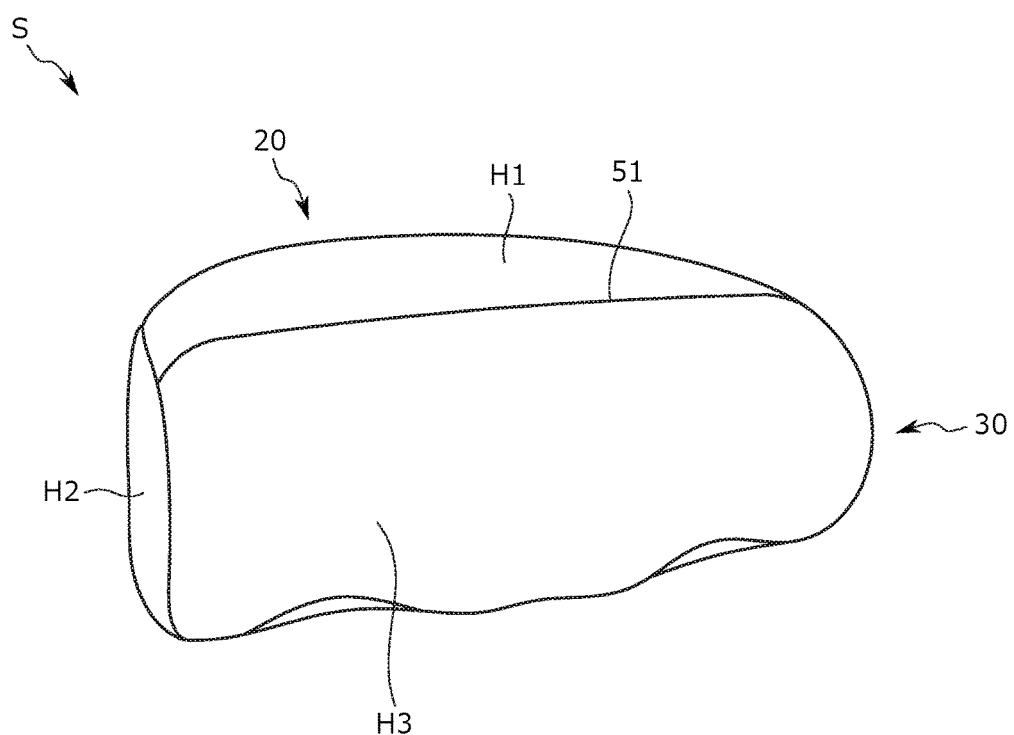
FIG. 4 illustrates a side portion at a front side of the two or three-wheeled vehicle straddle-type seat.
Figure 5:
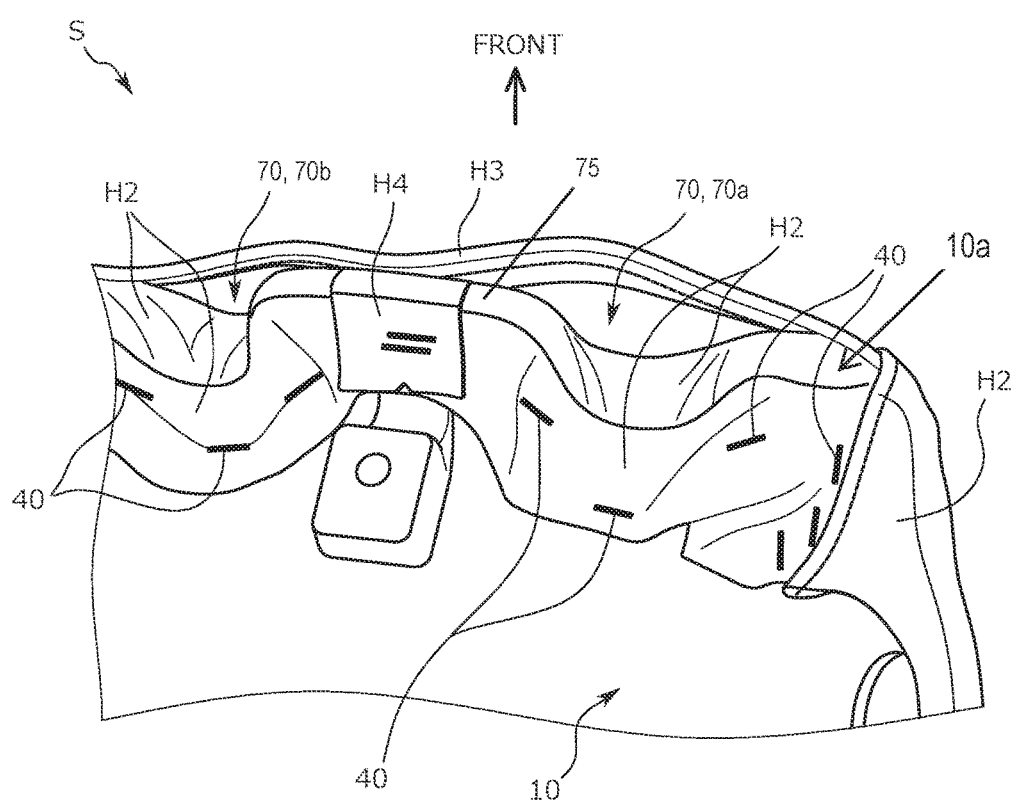
FIG. 5 is an explanatory drawing of the straddle-type seat, illustrating an enlarged view of a portion of FIG. 3.
Figure 6:
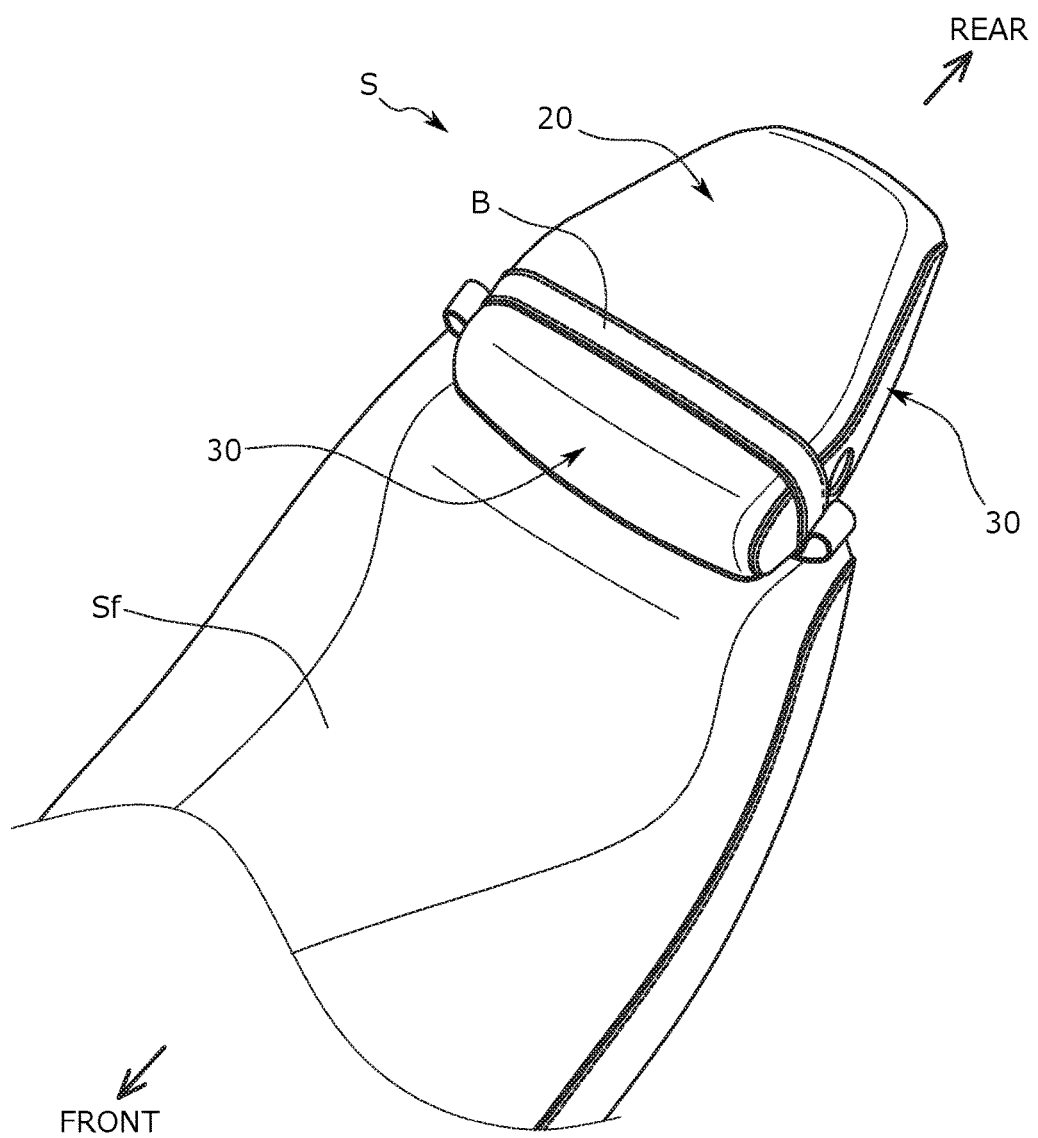
FIG. 6 is a perspective view of the straddle-type seat, illustrating a condition where the seat is arranged in a seated state.
Figure 7:
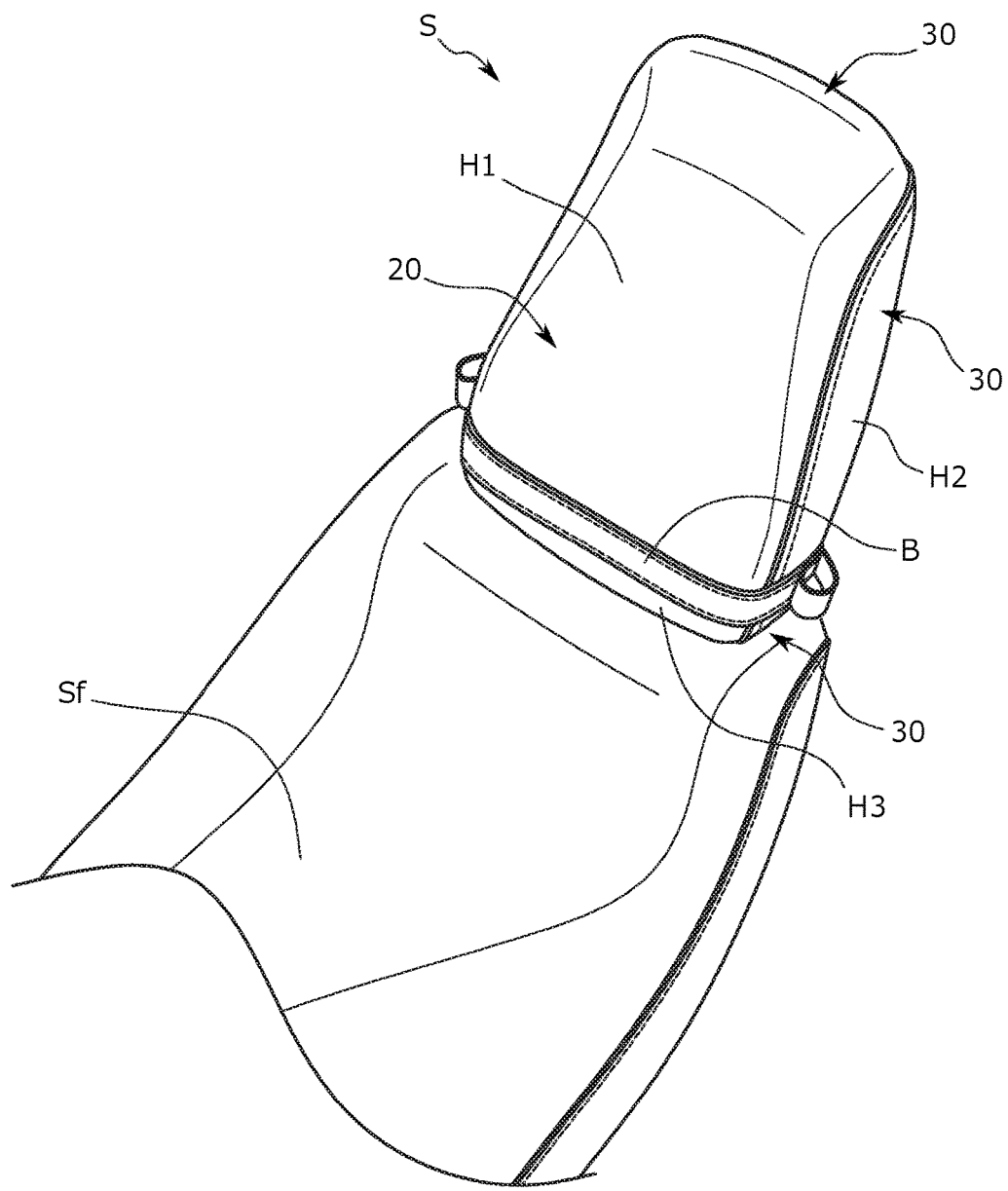
FIG. 7 is a perspective view of the straddle-type seat, illustrating a condition where the seat is arranged in a tip-up state.

The bottom plate 10 of the present embodiment is configured by a single plate body made of resin, for example, polypropylene (PP) or the like. Beads, protruded and recessed portions, or the like for strength improvement are appropriately formed at predetermined portions of the bottom plate 10. A rotation mechanism 60 which is described below is attached to a position on the front of the bottom plate 10 facing the vehicle body. A connecting portion 80 (see FIG. 3) to be detachably connected to the vehicle body is formed at a position on the rear of the bottom plate 10 facing the vehicle body. The connecting portion 80 is a gate-shaped engagement portion and is formed to be engaged and disengaged relative to a catching portion (not shown) or the like which is provided at the vehicle body. In addition, the side portion 30 corresponding to the lateral portion at the front side of the bottom plate 10 are provided with the cut portions which are formed by cutting out the bottom plate 10 in order to form the recessed portions 70 thereon. The cut portion of the present embodiment is a portion cut out into a circular arc shape. The cut portion of this circular arc shape forms the recessed portion 70.

Figure 8:
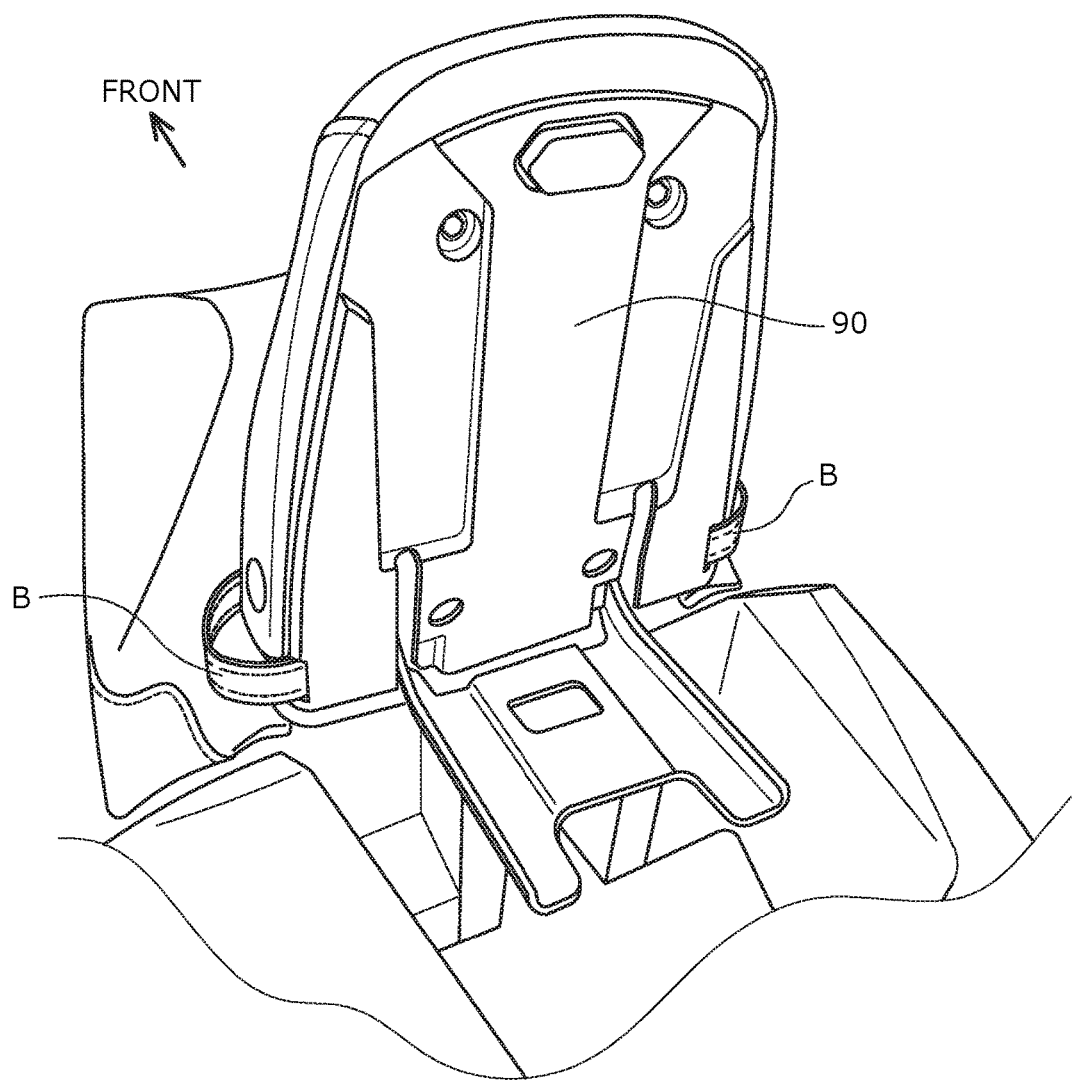
FIG. 8 is an explanatory drawing illustrating the back side of the straddle-type seat in a condition where a cover is attached to the two or three-wheeled vehicle straddle-type seat arranged in the tip-up state.
Figure 9:
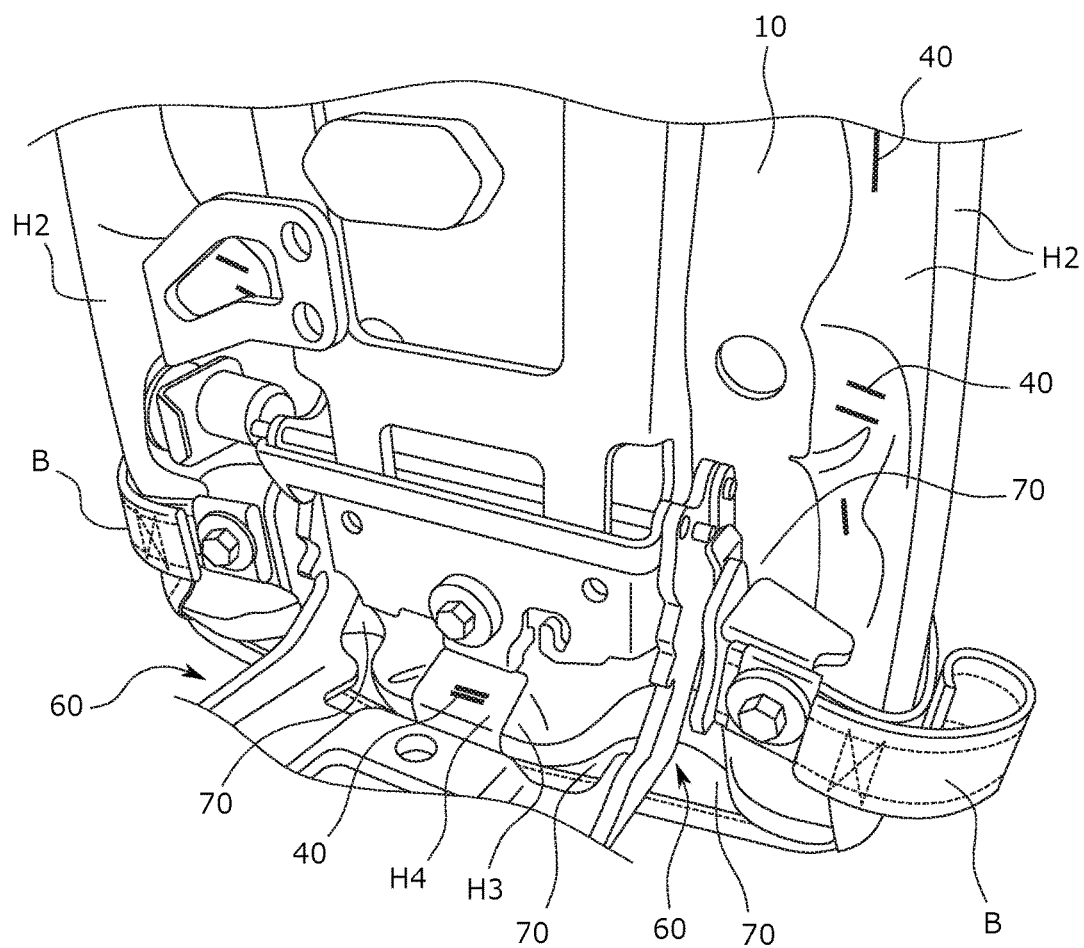
FIG. 9 is an explanatory drawing of the straddle-type seat, illustrating the back side in a condition where the cover is detached from the two or three-wheeled vehicle straddle-type seat arranged in the tip-up state.

FIG. 8 is an explanatory drawing illustrating the back side in a condition where a cover 90 for the two or three-wheeled vehicle straddle-type seat S is attached to the seat arranged in a tip-up state. FIG. 9 is an explanatory drawing illustrating the back side in a condition where the cover 90 of FIG. 8 is detached from the seat. In these drawings, the rotation mechanism is not illustrated in detail. In addition, the two or three-wheeled vehicle straddle-type seat S as the vehicle seat can be shifted between a seated state and the tip-up state by the rotation mechanism 60.

Further, the recessed portions 70 for the rotation mechanism 60 are formed at the side portion 30 at the front side facing the rotation mechanism 60. As described above, this recessed portion 70 is the cut portion which is formed by cutting out the bottom plate 10 and along which the side gusset portion H2 is arranged to cover the cut portion. In a case where the cut portion serving as the recessed portion 70 has a circular arc shape, a surface material attachment operation at the time of attachment of the surface material (the side gusset portion H2) along the cut portion can be easily performed with few wrinkles compared with a case where the cut portion has a rectangular shape. Furthermore, the outside of the recessed portion is covered by the hiding cover H3 serving as the cover member. Accordingly, even when the side portion 30 at the front side, which is in the seated state is exposed to the outside, the recessed portion is not exposed to the outside; therefore, the outer appearance may be improved.

TABLE OF REFERENCE NUMERALS

10: bottom plate
10a: side region of bottom plate
20: seating portion
30: side portion
40: staple
50: sewing line
51: first sewing portion
52: second sewing portion
53: third sewing portion
54: cutting portion
60: rotation mechanism
70: recessed portion
70a: first recessed portion
70b: second recessed portion
75: protruding portion
80: connecting portion
90: cover
K: cushion
H: surface material
H1: large portion (seating portion covering portion)
H3: hiding cover (cover member)
H4: fixing surface cover (extended portion)
Sf: front seat
B: belt
S: two or three-wheeled vehicle straddle-type seat

The invention claimed is:

1. A vehicle seat comprising:
a bottom plate;
a seating portion;
a side portion; and
a surface material that covers the seating portion and the side portion;
wherein the vehicle seat is configured to be shifted between a seated state and a tip-up state by a rotation mechanism,
wherein a recessed portion of the bottom plate is formed for the rotation mechanism at a portion of the side portion of the vehicle seat that faces the rotation mechanism,
wherein the surface material comprises a seating portion covering portion that covers the seating portion, a side gusset portion that covers the side portion, and a cover member that covers the recessed portion,
wherein the cover member covers i) the recessed portion, and ii) a part of a side region of the bottom plate that is provided with the recessed portion, together from a front side of the vehicle seat,
wherein the recessed portion is a cut portion cut out into a circular arc shape,
wherein the side gusset portion is attached to and covers the cut portion along the cut portion, and
wherein the cover member covers an outside of the recessed portion covered with the side gusset portion.

2. The vehicle seat according to claim 1, wherein the recessed portion is a cut portion formed by cutting out the bottom plate.

3. The vehicle seat according to claim 1, wherein an extended portion is provided at the cover member, and the extended portion is attached to an inner surface of the side portion.

4. The vehicle seat according to claim 1, wherein the side gusset portion and the cover member are formed by the same material.

5. The vehicle seat according to claim 1, wherein the recessed portion is a first recessed portion,
wherein the bottom plate further comprises a second recessed portion and a protruding portion provided between the first recessed portion and the second recessed portion,
wherein an extended portion is provided at the cover member, and
wherein the extended portion of the cover member is fixed to the protruding portion.

6. A vehicle seat comprising:
a bottom plate;
a seating portion;
a side portion; and
a surface material that covers the seating portion and the side portion;
wherein the vehicle seat is configured to be shifted between a seated state and a tip-up state by a rotation mechanism,
wherein a recessed portion of the bottom plate is formed for the rotation mechanism at a portion of the side portion of the vehicle seat that faces the rotation mechanism,
wherein the surface material comprises a seating portion covering portion that covers the seating portion, a side gusset portion that covers the side portion, and a cover member that covers the recessed portion,
wherein the cover member covers i) the recessed portion, and ii) a part of a side region of the bottom plate that is provided with the recessed portion, together from a front side of the vehicle seat,
wherein an extended portion is provided at the cover member, and the extended portion is attached to an inner surface of the side portion.

7. A vehicle seat comprising:
a bottom plate;
a seating portion;
a side portion; and a surface material that covers the seating portion and the side portion;

wherein the vehicle seat is configured to be shifted between a seated state and a tip-up state by a rotation mechanism, wherein a recessed portion of the bottom plate is formed for the rotation mechanism at a portion of the side portion of the vehicle seat that faces the rotation mechanism, wherein the surface material comprises a seating portion covering portion that covers the seating portion, a side gusset portion that covers the side portion, and a cover member that covers the recessed portion, wherein the cover member covers i) the recessed portion, and ii) a part of a side region of the bottom plate that is provided with the recessed portion, together from a front side of the vehicle seat, wherein the recessed portion is a first recessed portion, wherein the bottom plate further comprises a second recessed portion and a protruding portion provided between the first recessed portion and the second recessed portion, wherein an extended portion is provided at the cover member, and wherein the extended portion of the cover member is fixed to the protruding portion.

* * * * *